United States Patent
Bartolo

(10) Patent No.: US 10,413,867 B1
(45) Date of Patent: Sep. 17, 2019

(54) HEATING PURIFICATION ELEMENT FOR PURIFICATION OF EXHAUST GAS AND PURIFICATION DEVICE COMPRISING SUCH A PURIFICATION ELEMENT

(71) Applicant: FAURECIA SYSTEMES D'ECHAPPEMENT, Nanterre (FR)

(72) Inventor: Xavier Bartolo, Etouvans (FR)

(73) Assignee: Faurecia Systemes D'Echappement (FR)

( * ) Notice: Subject to any disclaimer, the term of this patent is extended or adjusted under 35 U.S.C. 154(b) by 0 days.

(21) Appl. No.: 16/357,406

(22) Filed: Mar. 19, 2019

(30) Foreign Application Priority Data

Mar. 20, 2018 (FR) ...................................... 18 52384

(51) Int. Cl.
*B01D 53/94* (2006.01)
*F01N 3/20* (2006.01)

(52) U.S. Cl.
CPC ........... *B01D 53/94* (2013.01); *F01N 3/2026* (2013.01)

(58) Field of Classification Search
CPC ..... B01D 53/94; F01N 3/2026; F01N 3/2013; F01N 3/28
USPC .......................................... 422/174; 219/552
See application file for complete search history.

(56) References Cited

U.S. PATENT DOCUMENTS

| | | | | |
|---|---|---|---|---|
| 5,070,694 A | * | 12/1991 | Whittenberger | F01N 3/2026 422/174 |
| 5,174,968 A | * | 12/1992 | Whittenberger | B01D 53/9454 422/174 |
| 5,384,099 A | * | 1/1995 | Sheller | B01J 35/04 422/174 |
| 5,546,746 A | * | 8/1996 | Whittenberger | B01J 35/0033 219/202 |
| 5,582,805 A | * | 12/1996 | Yoshizaki | F01N 3/2026 422/174 |
| 5,618,498 A | * | 4/1997 | Konya | B01J 35/04 228/121 |
| 5,651,906 A | * | 7/1997 | Whittenberger | B01J 35/0033 219/552 |

(Continued)

FOREIGN PATENT DOCUMENTS

| | | |
|---|---|---|
| DE | 2418310 A1 | 11/1975 |
| DE | 4301564 A1 | 7/1994 |

OTHER PUBLICATIONS

French Search Report for French Application No. 1852384 dated Jun. 15, 2018.

*Primary Examiner* — Tom P Duong
(74) *Attorney, Agent, or Firm* — Carlson, Gaskey & Olds, P.C.

(57) ABSTRACT

An exhaust gas purification member comprises an annular substrate centered on a central axis, a peripheral electrode alongside and against an outer cylindrical face of the substrate, and a central electrode alongside and against an inner cylindrical face of the substrate. The substrate is made up of an electrically conductive material and includes a plurality of intersecting walls defining longitudinal cells therebetween and that each emerge in an upstream face and in a downstream face of the substrate. These intersecting walls are covered with a catalytic composition and each wall extends from an outer cylindrical wall of the substrate, defining the outer cylindrical face, to the inner cylindrical wall of the substrate, defining the inner cylindrical face.

11 Claims, 5 Drawing Sheets

(56) References Cited

U.S. PATENT DOCUMENTS

| | | | |
|---|---|---|---|
| 5,672,324 A * | 9/1997 | Okamoto | B01J 35/04 422/173 |
| 5,851,495 A * | 12/1998 | Yoshizaki | F01N 3/2026 422/174 |
| 5,852,274 A * | 12/1998 | Watanabe | B01D 53/9454 219/117.1 |
| 7,410,929 B2 | 8/2008 | Ichikawa et al. | |
| 8,715,579 B2 | 5/2014 | Ido et al. | |

* cited by examiner

HEATING PURIFICATION ELEMENT FOR PURIFICATION OF EXHAUST GAS AND PURIFICATION DEVICE COMPRISING SUCH A PURIFICATION ELEMENT

CROSS-REFERENCE TO RELATED APPLICATIONS

This application is a U.S. non-provisional application claiming the benefit of French Patent Application No. 18 52384, filed on Mar. 20, 2018, which is incorporated herein by its entirety.

FIELD OF INVENTION

The present invention relates to a member for purifying exhaust gases of a vehicle, of the type comprising an annular substrate centered on a central axis and having an upstream face defining a first axial end of the substrate, a downstream face defining a second axial end of the substrate, an inner cylindrical face centered on the central axis and oriented toward the central axis, and an outer cylindrical face centered on the central axis and oriented opposite the central axis, the substrate comprising an inner cylindrical wall defining the inner cylindrical face and an outer cylindrical wall defining the outer cylindrical face, each of said inner and outer cylindrical walls being centered on the central axis, the substrate being made from an electrically conductive material and comprising a plurality of intersecting walls defining longitudinal cells therebetween and that each emerge in the upstream face and in the downstream face of the substrate, said intersecting walls being covered with a catalytic composition, the purification member further comprising a cylindrical peripheral electrode, alongside and against the outer cylindrical face of the substrate, and a cylindrical central electrode, alongside and against the inner cylindrical face of the substrate.

The invention also relates to an exhaust gas purification device comprising such a purification member.

BACKGROUND OF THE INVENTION

The exhaust lines of vehicles equipped with heat engines typically comprise catalytic purification members, for example making it possible to convert NOx, CO and hydrocarbons into $N_2$, $CO_2$ and $H_2O$. Such members are only effective when the catalytic material is at a minimum temperature.

A problem arises upon starting the vehicle, when the engine is still cold and the exhaust gases produced are at an insufficient temperature to heat the catalytic material to a sufficient temperature for the purification members to become active.

To resolve this problem, it has been proposed to make the substrate of the purification members from a material with a relatively low electrical resistance, and to circulate a strong electrical current in this substrate when starting the engine, or even before starting the engine, so as to cause rapid heating of the substrate, and in this manner, of the catalytic material deposited thereupon. Such a purification member is known from U.S. Pat. No. 8,715,579.

However, the known solutions are not fully satisfactory. Indeed, the electrical power is generally poorly distributed within the substrate, which on the one hand causes a nonhomogeneous heating of the purification member which, as a result, retains downgraded performance levels even after having been electrically heated, and on the other hand, breaking of said substrate by differential expansion.

SUMMARY OF THE INVENTION

One aim of the invention is thus to reduce the time needed for an exhaust gas purification member to achieve its optimal performance. Another aim is to homogenize the temperature within such a purification member when said member is electrically heated.

To that end, the invention relates to a purification member of the aforementioned type, wherein each of the intersecting walls extends from the outer cylindrical wall to the inner cylindrical wall.

According to specific embodiments of the invention, the purification member also has one or more of the following features, considered alone or according to any technically possible combination(s):
- the intersecting walls intersect at intersection points arranged on a plurality of isopotential circles on the central axis, each isopotential circle intersecting each of the intersecting walls at an intersection point of the intersecting wall with another intersecting wall;
- the intersecting walls comprise and are in particular made up of first walls and second walls, each first wall being concave on a first circumferential side and each second wall being concave on a second circumferential side, opposite the first side;
- each first wall does not intersect any other first wall and each second wall does not intersect any other second wall, each first wall intersecting a plurality of second walls and each second wall intersecting a plurality of first walls;
- the first walls are substantially parallel to one another, and the second walls are substantially parallel to one another;
- each intersecting wall has a linear radial section;
- the radial section is globally without inflection points;
- the intersecting walls form a pattern that repeats circumferentially around the central axis, said pattern being repeated more than ten times, preferably more than twenty times, and still more preferably more than fifty times;
- the substrate is formed by extrusion or by additive manufacturing;
- the peripheral electrode bears a plurality of electrically conductive radial protrusions distributed around the peripheral electrode, each radial protrusion protruding from the peripheral electrode in a direction opposite the central axis;
- the substrate is formed, at least partially, from silicon carbide;
- each of the electrodes is made from metal, in particular copper, steel such as stainless steel, nickel chromium alloy, iron chromium aluminum alloy or Inconel®; and
- each of the intersecting walls has a thickness decreasing from the upstream face to the downstream face of the substrate.

The invention also relates to a purification device comprising a power source and a purification member as defined above, wherein the central electrode is electrically connected to a first terminal of the power source, and the peripheral electrode is electrically connected to a second terminal of the power supply or the ground.

According to specific embodiments of the invention, the purification device also has one or more of the following features, considered alone or according to any technically possible combination(s):

- the purification device comprises an enclosure made from an electrical conducting material, said enclosure defining a conduit for guiding the exhaust gases to the upstream face of the substrate and at the outlet of the downstream face of the substrate, the purification member being mounted in said enclosure such that the peripheral electrode is electrically in contact with the enclosure;
- the peripheral electrode is spaced away from the enclosure by an insulating layer;
- the purification device comprises an electrical connector electrically connecting the central electrode to the first terminal of the power source, said electrical connector extending through the enclosure while being electrically insulated from said enclosure; and
- the purification member forms a first purification member, the purification device comprising a second purification member arranged downstream from the first purification member.

BRIEF DESCRIPTION OF THE DRAWINGS

Other features and advantages of the invention will appear upon reading the following description, provided solely as an example and done in reference to the appended drawings, in which.

DETAILED DESCRIPTION

Figure 1:
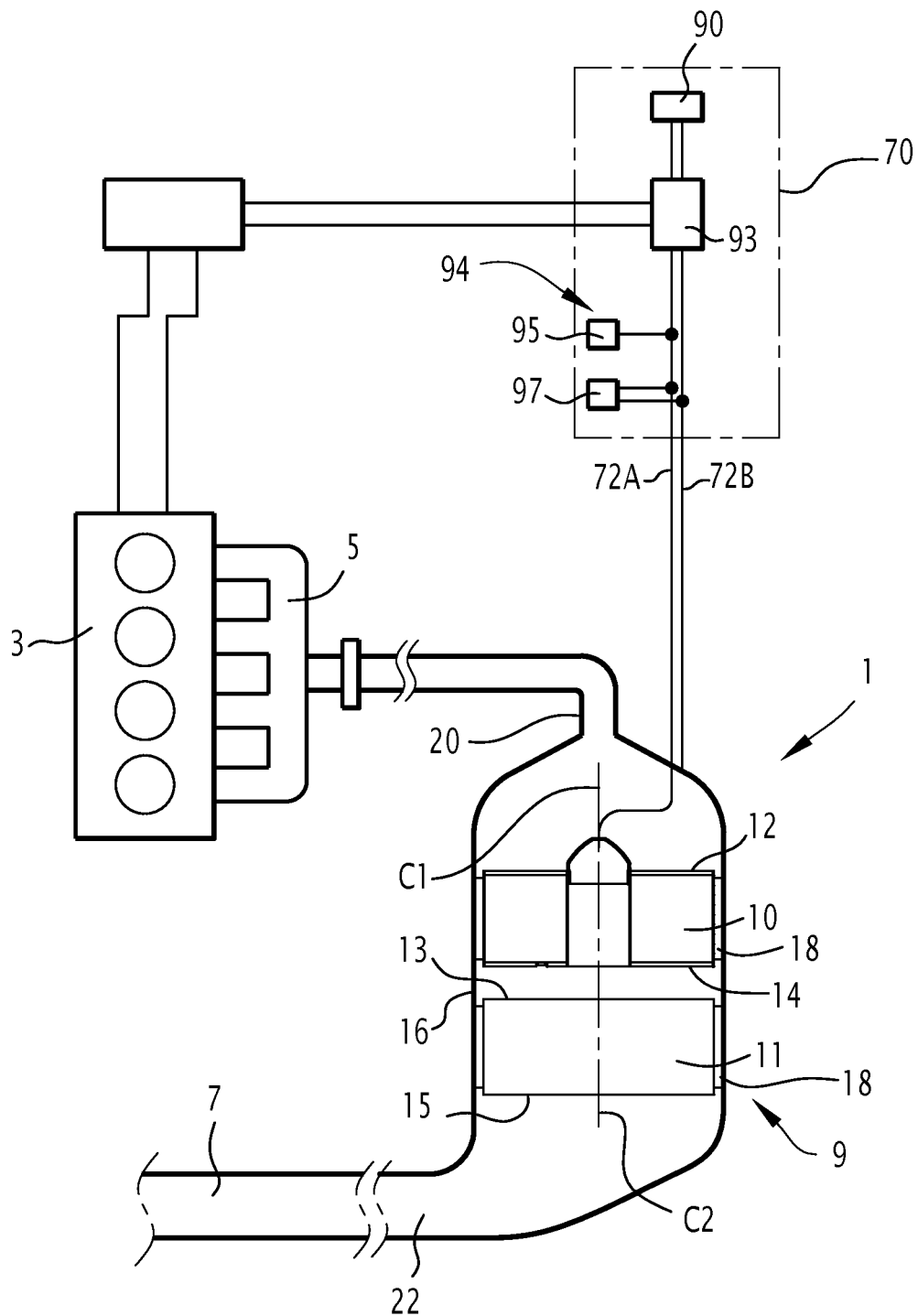
FIG. 1 is a simplified schematic illustration of a motor vehicle exhaust line incorporating an exhaust gas purification device according to the invention.

The exhaust line 1 shown in FIG. 1 is intended to be installed on board a vehicle, typically a vehicle equipped with a heat engine 3. This vehicle is typically a motor vehicle, for example a car or truck.

As shown in FIG. 1, the exhaust line 1 comprises a manifold 5 capturing the exhaust gases leaving the combustion chambers of the heat engine 3, and a nozzle 7 making it possible to release the exhaust gases into the atmosphere. The exhaust line 1 also comprises an exhaust gas purification device 9, fluidly inserted between the manifold 5 and the nozzle 7, such that the exhaust gases coming from the nozzle 7 have been purified by said purification device 9.

The purification device 9 includes at least one exhaust gas purification member 10, 11.

Figure 2:
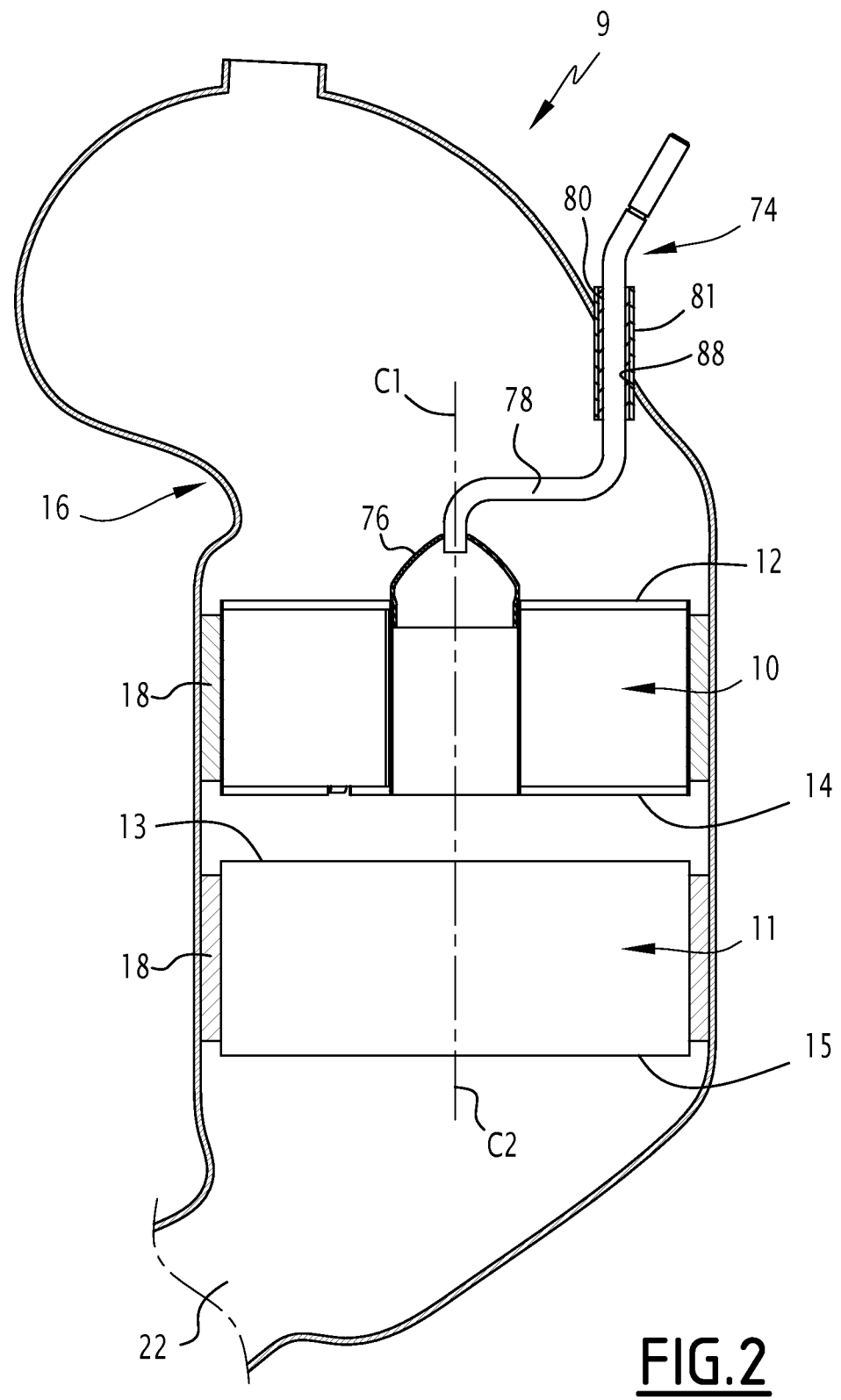
FIG. 2 is a sectional view of part of a purification device of the exhaust line of FIG. 1.

In reference to FIG. 2, said purification device 9 includes a first exhaust gas purification member 10 having an upstream face 12 by which the exhaust gases penetrate the first purification member 10, and a downstream face 14 by which the exhaust gases leave the first purification member 10.

In the present description, upstream and downstream will be understood relative to the normal direction of circulation of the exhaust gases in the exhaust line 1.

The first purification member 10 has a central axis C1 connecting the upstream face 12 to the downstream face 14.

In the illustrated example, the purification device 9 further includes a second exhaust gas purification member 11 having an upstream face 13 by which the exhaust gases penetrate the second purification member 11, and a downstream face 15 by which the exhaust gases leave the second purification member 11.

The second purification member 11 has a central axis C2 connecting the upstream face 13 to the downstream face 15.

Here, the first purification member 10 and the second purification member 11 are arranged coaxially to one another, the second purification member 11 being arranged immediately downstream from the first purification member 10. "Arranged immediately downstream" means that the second purification member 11 has its upstream face 13 arranged opposite the downstream face 14 of the first purification member 10, at a distance from said downstream face 14 of less than 50 mm.

Alternatively, the second purification member 11 is not arranged coaxially with the first purification member 10, and is arranged further downstream relative to the first purification member 10, for example below the vehicle, at a distance greater than 20 cm from the first purification member 10.

The first and second purification members 10, 11 are, for example, made up of two separate elements chosen from among: an SCR catalyst, a three-way catalyst, an oxidation catalyst, a SCRF particle filter and an NOx trap.

Preferably, the first and second purification members 10, 11 are two three-way catalysts. These two three-way catalysts can be impregnated with different precious metals.

The purification device 9 also comprises enclosure 16 inside which the purification members 10, 11 are placed, and a holding layer 18 inserted between each purification member 10, 11 and the enclosure 16.

The enclosure 16 is made from an electrically conductive material.

The enclosure 16 has an exhaust gas inlet 20 (FIG. 1), fluidly connected to the manifold 5, and an exhaust gas outlet 22, fluidly connected to the nozzle 7. The enclosure 16 is suitable for guiding the exhaust gases from the exhaust gas inlet 20 to the exhaust gas outlet 22 such that said exhaust gases cross the first and second purification members 10, 11 on their path. To that end, the enclosure 16 defines a pipe for guiding the exhaust gases from the exhaust gas inlet 20 to the upstream face 12 of the purification member 10, at the outlet of the downstream face 14 of the first purification member 10 to the upstream face 13 of the second purification member 11, and at the outlet of the downstream face 15 of the second purification member 11 to the exhaust gas outlet 22.

The holding layer 18 is made from an electrically insulating material.

Figure 3:
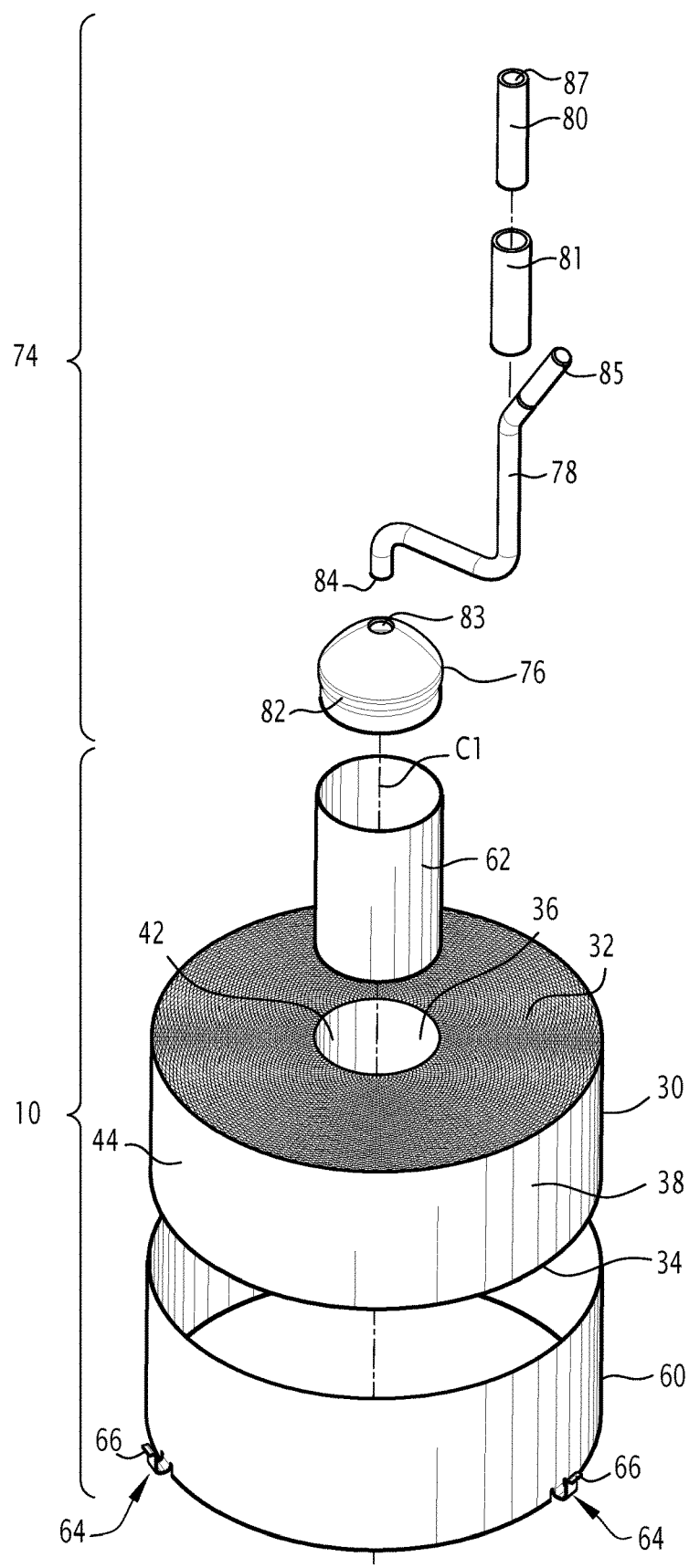
FIG. 3 is an exploded perspective view of a purification member and an electrical connector of the purification device of FIG. 2.

In reference to FIG. 3, the first purification member 10 comprises an annular substrate 30 centered on the central axis C1 of the purification member 10.

Said substrate 30 is in particular in a single piece. The substrate 30 is preferably formed by extrusion or additive manufacturing.

The substrate 30 has a first radial face 32, substantially planar, defining a first axial end of the substrate 30. This first radial face 32 constitutes the upstream face 12 of the purification member 10. Thus, this first radial face 32 corresponds to the upstream face 12 of the substrate 30.

The substrate 30 also has a second radial face 34, substantially planar, defining a second axial end of the substrate 30. This second radial face 34 constitutes the downstream face 14 of the purification member 10. Thus, this second radial face 34 corresponds to the downstream face 14 of the substrate 30.

The substrate 30 further has an inner cylindrical face 36 centered on the central axis C1 and oriented toward the central axis C1, and an outer cylindrical face 38 centered on the central axis C1 and oriented away from the central axis C1. Each of these cylindrical faces 36, 38 here is cylindrical of revolution.

The inner cylindrical face 36 has a diameter smaller than 33% of the diameter of the outer cylindrical face 38.

The substrate 30 comprises an inner cylindrical wall 42 and an outer cylindrical wall 44, each centered on the cylindrical axis C1. The inner cylindrical wall 42 defines the inner cylindrical face 36. The outer cylindrical wall 44 defines the outer cylindrical face 38.

Each of the cylindrical walls 42,44 is solid.

Figure 4:
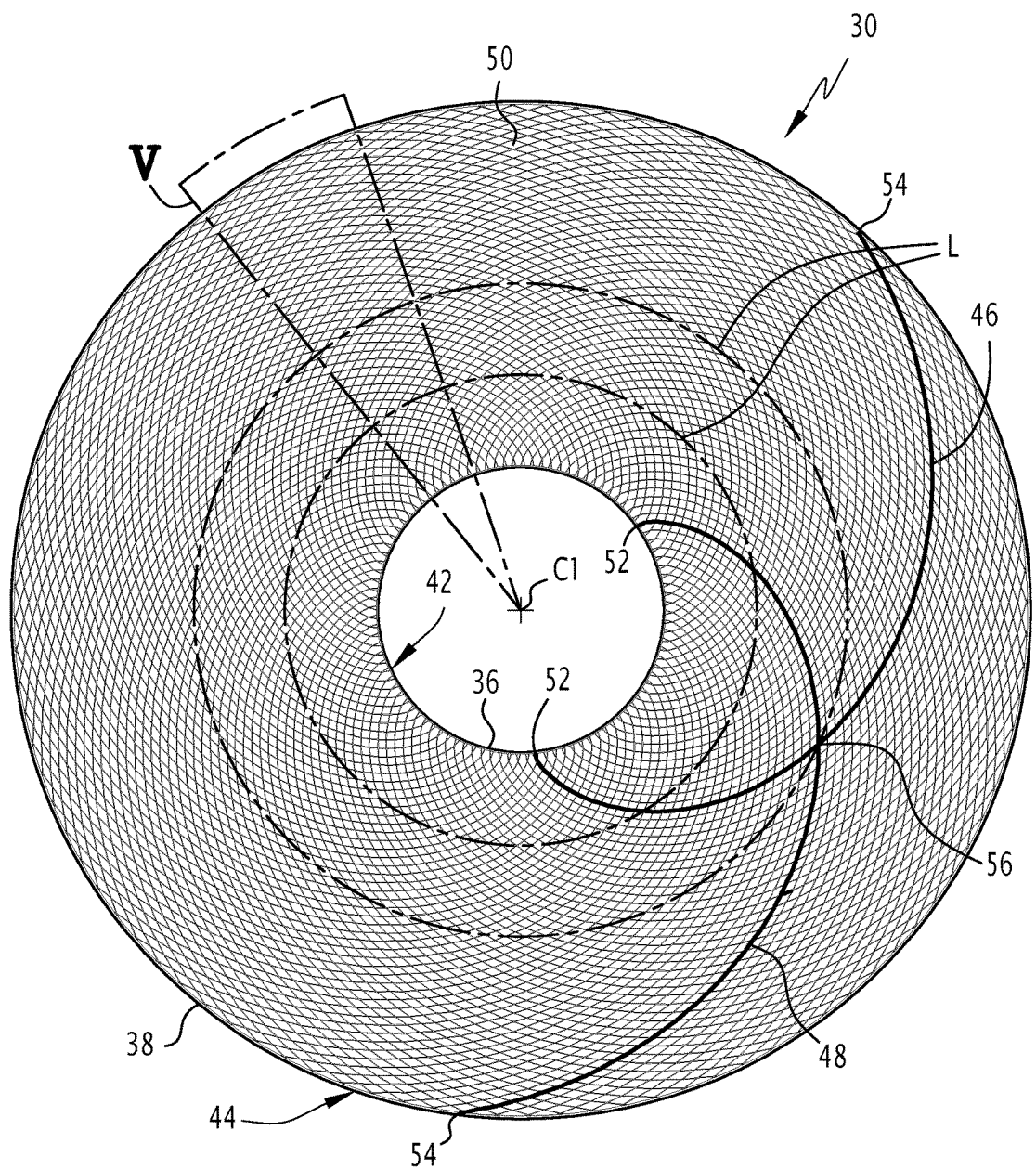
FIG. 4 is a front view of a substrate of the purification member of FIG. 3.
Figure 5:
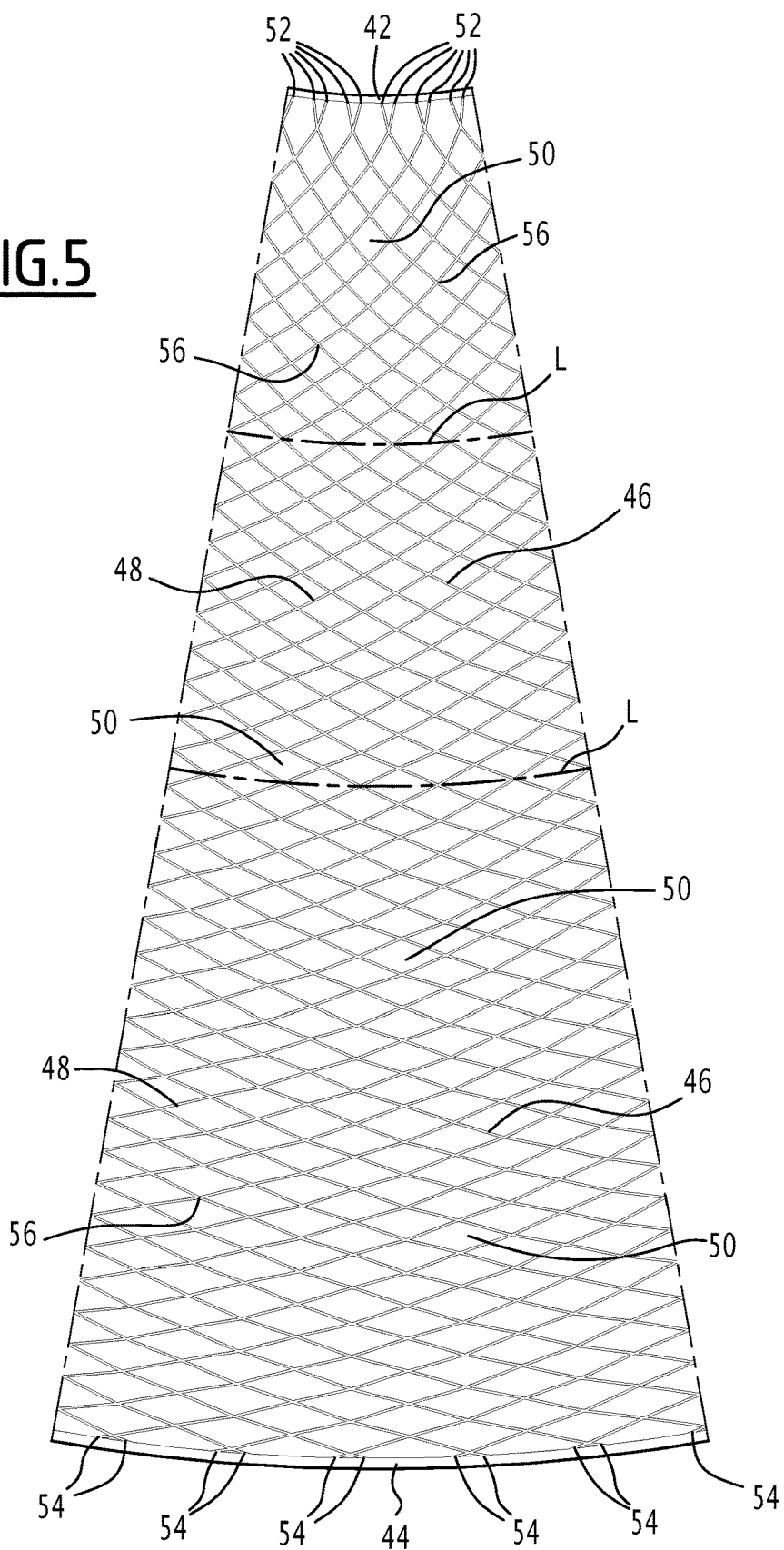
FIG. 5 is a view of a detail marked V in FIG. 4.

In reference to FIGS. 4 and 5, the substrate 30 also comprises a plurality of intersecting walls 46, 48 defining longitudinal cells 50 between them each emerging in the downstream face 14 and in the upstream face 12 of the substrate 30. Such that the member 10 can perform its exhaust gas purification function, each intersecting wall 46, 48 is covered by a catalytic composition (not shown).

Each intersecting wall 46, 48 has a linear radial section. In other words, the section of each intersecting wall 46, 48, taken in a plane orthogonal to the central axis C1, has the shape of a line.

This line globally has no inflection point, i.e., it is globally straight, or curved with a curvature that globally never reverses. In other words, for any pair of points of said line spaced apart from one another by a distance greater than 1% of the diameter of the outer cylindrical face 38, the portions of the line located outside the area situated between the points of said pair are located on a same side of the line connecting said points or are substantially aligned with said line.

Each intersecting wall 46, 48 is also solid.

Each intersecting wall 46, 48 has a constant thickness from the downstream face 14 to the upstream face 12 of the substrate 30.

Alternatively, each intersecting wall 46, 48 has a decreasing thickness from the downstream face 14 to the upstream face 12 of the substrate 30.

According to the invention, each intersecting wall 46, 48 extends from a first end 52 alongside the inner cylindrical wall 42 to a second end 54 alongside the outer cylindrical wall 44. Thus, each intersecting wall 46, 48 extends from the outer cylindrical wall 44 to the inner cylindrical wall 42.

The intersecting walls 46, 48 intersect at intersection points 56 arranged on a plurality of concentric circles L centered on the central axis C1, each concentric circle L intersecting each of the intersecting walls 46, 48 at an intersection point 56 of said intersecting wall 46, 48 with another intersecting wall 46, 48.

The intersecting walls 46, 48 are made up of first walls 46 and second walls 48. One of said first walls 46 and one of said second walls 48 are shown in thick lines in FIG. 4 in order to improve their visibility.

As shown in FIG. 4, each first wall 46 globally forms a first concave arch on a first circumferential side. This first arch is defined by a generatrix parallel to the central axis C1. In the illustrated example, each first arch is concave in the counterclockwise direction.

The curve radius of each first arch decreases from the outer cylindrical face 38 to the inner cylindrical face 36.

The first walls 46 are substantially parallel to one another. Thus, each first wall 46 does not intersect any other first wall 46. Each first wall 46, however, intersects a plurality of second walls 48.

Each second wall 48 locally forms a second concave arch on a second circumferential side. This second arch is defined by a generatrix parallel to the central axis C1. In the illustrated example, each second arch is concave in the clockwise direction.

The curve radius of each second arch decreases from the outer cylindrical face 38 to the inner cylindrical face 36.

The second walls 48 are substantially parallel to one another. Thus, each second wall 48 does not intersect any other second wall 48. Each second wall 48, however, intersects a plurality of first walls 46.

Each point of intersection 56 is therefore made up of a point of intersection between a first wall 46 and a second wall 48. This pair of first and second walls 46, 48 is specific to each point of intersection 56; in other words, for each pair of first and second walls 46, 48, said first and second walls 46, 48, when they intersect, only cross one single time.

The first and second walls 46, 48 form a pattern that repeats circumferentially around the central axis C1, said pattern being repeated more than ten times and preferably more than twenty times. In the illustrated example, this pattern is repeated more than fifty times.

The thickness of the first and second walls 46, 48, the number of longitudinal cells 50, the diameter and the height of the substrate 30, as well as the nature of the catalytic material, are determined as a function of the type of purification member made up by the first purification member 10, the type of the engine 3 and the control of said engine 3.

Returning to FIG. 3, the first purification member 10 also comprises a cylindrical peripheral electrode 60, alongside against the outer cylindrical face 38 of the substrate 30, and a cylindrical central electrode 62, alongside against the inner cylindrical face 36 of the substrate 30.

The peripheral electrode 60 closely marries the outer cylindrical face 38 of the substrate 30; in other words, the peripheral electrode 60 is in electrical contact with the outer cylindrical face 38 of the substrate 30 over substantially its entire surface. To that end, the substrate 30 is typically snap-fitted in the peripheral electrode 60 or connected by casting or an electrically conductive glue.

The peripheral electrode 60 is made from metal, typically copper, steel such as stainless steel, nickel chromium alloy, iron chromium aluminum alloy or Inconel®. It is in particular formed from a sheet wound around itself.

The peripheral electrode 60 is spaced away from the enclosure 16 by the holding layer 18, while being electrically in contact with said enclosure 16. To that end, the peripheral electrode 60 bears a plurality of electrically conductive radial protrusions 64 distributed around the peripheral electrode 60.

In the illustrated example, there are three of these radial protrusions 64.

Each radial protrusion 64 protrudes from the peripheral electrode 60 in a direction opposite the central axis C1. Each radial protrusion 64 advantageously, as shown, is in the form of a curved tongue, in particular in the upstream direction, with, at its distal end furthest from the electrode 60, a radial portion 66 suitable for being inserted into a complementary recess (not shown) of the enclosure 16.

The radial protrusions 64 are thus suitable for retaining the purification member 10 in the enclosure 16, while producing electrical contact between the peripheral electrode 60 and the enclosure 16.

Each radial protrusion 64 is preferably integral with the peripheral electrode 60. To that end, each radial protrusion 64 is typically formed, as shown, by a stamped sheet end taken from the same sheet as that forming the peripheral electrode 60.

The central electrode 62 closely marries the inner cylindrical face 36 of the substrate 30; in other words, the central electrode 62 is in electrical contact with the inner cylindrical face 36 of the substrate 30 over substantially its entire surface. To that end, the central electrode 62 is typically snap-fitted in the substrate 30 or connected by casting or an electrically conductive glue.

The central electrode 62 is made from metal, typically copper, steel such as stainless steel, nickel chromium alloy, iron chromium aluminum alloy or Inconel®. It is in particular formed from a sheet wound around itself.

Returning to FIG. 1, the purification device 9 also comprises a power source 70 with a first terminal 72A and a second terminal 72B for supplying the purification member 10 with electricity.

The first terminal 72A is electrically connected to the central electrode 62 of the purification member 10 via an electrical connector 74 (FIG. 3) extending through the enclosure 16 while being electrically insulated from said enclosure 16.

In reference to FIG. 3, the electrical connector 74 comprises a connector cone 76, a conductive rod 78, an insulating ring 80 and a support ring 81.

The connector cone 76 is made up of an electrically conductive material. It comprises a wide base 82, fitted into the central electrode 62, and a narrow apex 83, connected to the rod 78.

The rod 78 has a first end 84 for connecting to the cone 76 and an opposite second end 85 for connecting to the first terminal 72A. The first end 84 is engaged in the apex 83 of the connector cone 76. The second end 85 extends outside the enclosure 16.

The rod 78 is advantageously flexible. Thus, the assembly of the purification device 9 is made easier and the forces in the material of the substrate 30 are controlled.

The insulating ring 80 is made from an electrically insulating material, for example a ceramic. It defines a passage 87 passed through by the rod 78. It is in turn housed in the support ring 81.

The support ring 81 is arranged around the insulating ring 80, concentrically to the insulating ring 80. The support ring 81 extends through a through orifice 88 (FIG. 2) arranged in the enclosure 16.

Returning to FIG. 1, the second terminal 72B is electrically connected to the enclosure 16, typically using an electrical connection formed by a threaded rod welded on the enclosure 16. Alternatively (not shown), the enclosure 16 is electrically connected to the ground using the same type of electrical connection.

The peripheral electrode 60 of the purification member 10 is therefore electrically connected to the second terminal 72B of the power source 70, or to the ground.

The first end 52 of each of the intersecting walls 46, 48 is thus electrically connected to the first terminal 72A of the power source 70, and the second end 54 of each of the intersecting walls 46, 48 is electrically connected to the second terminal 72B of the power source 70, or to the ground. As a result, when the power source 70 is active, there is a difference in electrical potential between the first end 52 and the second end 54 of each intersecting wall 46, 48. This difference in electrical potential depends on the difference in potential between the terminals 72A, 72B of the power source 70.

The substrate 30 is suitable for each intersecting wall 46, 48 to be able to be heated to a temperature between 150 and 1300° C., preferably between 200 and 1000° C., and still more preferably between 300 and 600° C., under the effect of the difference in potential applied between its first and second ends 52, 54. The substrate 30 is also suitable for withstanding oxidation in the presence of exhaust gas.

To that end, the substrate 30 is made from a chemically resistant and electrically conductive material. In particular, the substrate 30 is formed, at least partially, from silicon carbide and is in particular made up of silicon carbide. Alternatively, the substrate 30 is made from silicon carbide impregnated with silicon, or graphene-doped cordierite.

The resistivity of the material making up the substrate 30 is determined based on the characteristics of the power source 70, the volume of the substrate 30, the thickness of the intersecting walls 46, 48, the activation temperature of the catalytic material and the desired startup speed.

The concentric circles L, at which the intersecting walls 46, 48 intersect, thus form isopotential lines or circles. The particular arrangement of the intersecting walls 46, 48 described above allows a relatively homogeneous distribution of the current inside the substrate 30.

The power source 70 further comprises an electrical energy source 90, for example made up of the electric battery of the vehicle, or a supercapacitor device.

The electrical energy source 90 is preferably positioned near the purification member 10. It is thus possible to reduce the length of the power cables while increasing their section, and in this way to decrease the power losses in these cables.

The electric energy source 90 is typically suitable for providing a direct or choppy current, under a voltage depending on the vehicle (12 or 48 volts, for example). When this current is direct, the electrical energy source 90 is preferably suitable for providing a greater potential to the first terminal 72A than to the second terminal 72B.

The power source 70 also comprises a controller 93 arranged to control the supply of the substrate 30 with electricity.

The controller 93, for example, comprises an information processing unit formed by a processor and a memory associated with the processor. Alternatively, the controller 93 is made in the form of programmable logic components, such as FPGAs (Field-Programmable Gate Arrays) or dedicated integrated circuits, such as ASICs (Application-Specific Integrated Circuit).

The controller 93 is in particular configured to choose the voltage and the electric current that are provided by the power source 70 to the substrate 30, so as to keep the consumed heating power and/or consumed electrical power and/or the temperature of the substrate 30 within a predetermined range.

The controller 93 controls the heating by pulse width modulation (PWM) or high-intensity direct current.

The power source 70 further includes an acquisition member 94 that acquires the intensity of the electric current powering the substrate 30 and the voltage across the terminals of the substrate 30.

This acquisition member 94 is of any suitable type.

For example, the acquisition member 94 includes a sensor 95 for measuring electric current and a sensor 97 for measuring the electric voltage. Alternatively, the intensity of the electric current and the electric voltage are obtained by calculation, from information recovered in the controller 93.

The controller 93 is advantageously configured to control the temperature of the substrate 30 and monitor the proper operation of the substrate 30, determine the temperature of the exhaust gases when the substrate is no longer supplied with electricity, and determine the exhaust gas flow rate through the purification member 10, once the substrate 30 is no longer supplied with electricity. To that end, the controller 93 is typically configured to carry out the control programs described in application FR 17 53059.

Owing to the invention described above, it is possible to obtain a rapid and homogeneous temperature increase of the purification member 10, without risking deterioration thereof. As a result, the time needed for the purification member 10 to reach its optimal performance is reduced. In the case of preheating, the waiting time before starting up the engine is reduced.

Furthermore, the first purification member 10 heats the exhaust gases that pass through it and releases the exothermal energy of the first pollutants that pass through it, which makes it possible, by convection, also to heat the second purification member 11 arranged immediately downstream. As a result, the time needed for the second purification member 11 to reach its optimal performance is also reduced.

Furthermore, the invention described above is very versatile, since it is easily adaptable on existing exhaust lines, this adaptation simply requiring replacing a purification device with the purification device 9, without modification to the rest of the exhaust line.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A purification member for purifying exhaust gases of a vehicle, comprising:
   a substrate that is annular and centered on a central axis and that has an upstream face defining a first axial end of the substrate, a downstream face defining a second axial end of the substrate, an inner cylindrical face centered on the central axis and oriented toward the central axis, and an outer cylindrical face centered on the central axis and oriented opposite the central axis, the substrate comprising an inner cylindrical wall defining the inner cylindrical face and an outer cylindrical wall defining the outer cylindrical face, each of said inner and outer cylindrical walls being centered on the central axis, the substrate being made from an electrically conductive material and comprising a plurality of intersecting walls defining longitudinal cells therebetween and that each emerge in the upstream face and in the downstream face of the substrate, said plurality of intersecting walls being covered with a catalytic composition;
   a cylindrical peripheral electrode alongside and against the outer cylindrical face of the substrate; and
   a cylindrical central electrode alongside and against the inner cylindrical face of the substrate, and wherein each of the plurality of intersecting walls extends from the outer cylindrical wall to the inner cylindrical wall.

2. The purification member according to claim 1, wherein the plurality of intersecting walls intersect at intersection points arranged on a plurality of isopotential circles centered on the central axis, each isopotential circle intersecting each of the plurality of intersecting walls at an intersection point of one intersecting wall with another intersecting wall.

3. The purification member according to claim 1, wherein the plurality of intersecting walls comprise first walls and second walls, each first wall being concave on a first circumferential side and each second wall being concave on a second circumferential side, opposite the first side.

4. The purification member according to claim 3, wherein each first wall does not intersect any other first wall and each second wall does not intersect any other second wall, each first wall intersecting a plurality of second walls and each second wall intersecting a plurality of first walls.

5. The purification member according to claim 1, wherein the substrate is formed, at least partially, from silicon carbide.

6. The purification member according to claim 1, wherein each of the cylindrical peripheral and cylindrical central electrodes is comprised of metal.

7. The purification member according to claim 6, wherein each of the cylindrical peripheral and cylindrical central electrodes is comprised of a metal selected from the group consisting of: copper, steel, stainless steel, nickel chromium alloy, iron chromium aluminum alloy and Inconel®.

8. The purification member according to claim 1, wherein each of the plurality of intersecting walls has a thickness decreasing from the upstream face to the downstream face of the substrate.

9. A purification device comprising:
   a power source; and
   the purification member according to claim 1, wherein the cylindrical central electrode is electrically connected to a first terminal of the power source, and the cylindrical peripheral electrode is electrically connected to a second terminal of the power supply or to ground.

10. The purification device according to claim 9, comprising an enclosure made from an electrical conducting material, said enclosure defining a conduit to guide the exhaust gases to the upstream face of the substrate and at an outlet of the downstream face of the substrate, the purification member being mounted in said enclosure such that the cylindrical peripheral electrode is electrically in contact with the enclosure.

11. The purification device according to claim 9, wherein the cylindrical peripheral electrode is spaced away from the enclosure by an insulating layer.

* * * * *